United States Patent
Blanco

(10) Patent No.: US 11,230,786 B2
(45) Date of Patent: Jan. 25, 2022

(54) NANO-POROUS ANODIC ALUMINUM OXIDE MEMBRANE FOR HEALTHCARE AND BIOTECHNOLOGY

(71) Applicant: Nanopec, Inc., Tucson, AZ (US)

(72) Inventor: Mario Blanco, Tucson, AZ (US)

(73) Assignee: NANOPEC, INC., Tuscon, AZ (US)

( * ) Notice: Subject to any disclaimer, the term of this patent is extended or adjusted under 35 U.S.C. 154(b) by 11 days.

(21) Appl. No.: 16/442,608

(22) Filed: Jun. 17, 2019

(65) Prior Publication Data

US 2020/0392639 A1    Dec. 17, 2020

(51) Int. Cl.

| | |
|---|---|
| C25D 11/04 | (2006.01) |
| B01D 67/00 | (2006.01) |
| B01D 69/12 | (2006.01) |
| B01D 71/02 | (2006.01) |
| C25D 11/24 | (2006.01) |
| C25F 3/20 | (2006.01) |

(52) U.S. Cl.
CPC ........ C25D 11/045 (2013.01); B01D 67/0065 (2013.01); B01D 67/0079 (2013.01); B01D 69/12 (2013.01); B01D 71/025 (2013.01); C25D 11/24 (2013.01); C25F 3/20 (2013.01); B01D 2323/42 (2013.01)

(58) Field of Classification Search
CPC .................... B01D 67/0065; C25D 11/04–246
See application file for complete search history.

(56) References Cited

U.S. PATENT DOCUMENTS

| 4,859,288 A | * | 8/1989 | Furneaux | ........... B01D 67/0065 |
| | | | | 205/75 |
| 2008/0070056 A1 | * | 3/2008 | Hatanaka | ............. C25D 11/045 |
| | | | | 428/593 |
| 2013/0319869 A1 | * | 12/2013 | Turner | ................... C25D 11/16 |
| | | | | 205/81 |

(Continued)

FOREIGN PATENT DOCUMENTS

| JP | S59-132978 A | * | 7/1984 |
| JP | 2009-030079 A | * | 2/2009 |
| JP | 2011179103 A | * | 9/2011 |

OTHER PUBLICATIONS

Aso, Machine Translation, JP 2011-179103 A (Year: 2011).*

(Continued)

*Primary Examiner* — Ho-Sung Chung
(74) *Attorney, Agent, or Firm* — Bond Schoeneck & King, PLLC; David Nocilly

(57) ABSTRACT

A method of manufacturing a nano-structured aluminum oxide film. The first step involves degreasing an aluminum plate using a degreasing solution. The next step involves electropolishing the aluminum plate after degreasing with an electropolishing solution that is free of perchloric acid and chromic acid. The next step involves pre-anodizing the aluminum plate after electropolishing with an anodization acid solution for a first predetermined time period. The next step involves anodizing the aluminum plate after electropolishing with the anodization acid solution for a second predetermined time period to form an anodized membrane on the aluminum plate. The next step involves separating the anodized membrane from the aluminum plate with a solution free of chrome. The last step involves cleaning the anodized membrane.

11 Claims, 8 Drawing Sheets

(56) References Cited

U.S. PATENT DOCUMENTS

2014/0083843 A1\* 3/2014 Chuang ................ C25D 11/10
204/239

OTHER PUBLICATIONS

Morita, Machine Translation, JP S59-132978 A (Year: 1984).\*
Yanagishita et al., High-Throughput Fabrication Process for Highly Ordered Through-Hole Porous Alumina Membranes Using Two-Layer Anodization, 184 Electrochimica Acta 80 (Year: 2015).\*
Hatanaka et al., Machine Translation, JP 2009-030079 A (Year: 2009).\*

\* cited by examiner

NANO-POROUS ANODIC ALUMINUM OXIDE MEMBRANE FOR HEALTHCARE AND BIOTECHNOLOGY

BACKGROUND OF THE INVENTION

1. Field of the Invention

The present invention to relates to synthetic nano-structured anodic aluminum oxide (AAO) ceramic membranes and, more particularly, nano-porous aluminum oxide membranes (AOM) and films suitable for healthcare and biotechnology applications.

2. Description of the Related Art

Processes for producing aluminum oxide films using electrochemical anodization first appeared in a patent by Alan W. Smith of the Boeing Company in 1974. The method uses aluminum as an anode in an electrochemical cell where an acid solution (typically oxalic, sulfuric, phosphoric, etc.) is used as an electrolyte. Under most conditions an amorphous oxide layer is produced. Masuda and Fukuda in 1995 developed a two-step anodization method to produce ordered (hexagonal close pack) porous aluminum oxide, based on the observation that for a specific acid concentration, temperature and biased voltage, the first anodization is capable of producing ordered pores over time.

Recent advances in the synthesis of nano-structured aluminum oxide films have made it possible to precisely control the morphology as well as physical and chemical properties of anodic aluminum oxide films (close pore) and membranes (through open pores). These synthetic nano-structured materials have important biological and medical applications that involve sorting, sensing, isolating, and releasing biological molecules that make them increasingly attractive for healthcare and biotechnology applications. A few application examples are briefly described below.

First, nano-porous systems engineered to mimic natural filtration systems are actively being developed for use in ultra-filtration, smart implantable drug delivery systems, artificial organs, and other novel nano-enabled medical devices. For example, improved filtration membranes, with ordered, uniformly distributed nano-pores are needed for ultra-filtration as the means to avoid contamination related FDA recalls, harm to patients, lawsuits, and loss of brand reputation. These defect-free, ordered nano-porous, membranes could be used for filter sterilization to replace the standard cellulose and polymer based commercial microfilters, with 0.2 micron random pores, to ensure that contaminants, such as bacteria, viruses and microparticles are not found in the final drugs delivered to patients.

Second, synthetic cell culture substrates that can be easily manufactured are sought to improve the rates of growth and cell viability. In particular, these nano-porous membranes could be used as cell scaffolds that provide as much oxygen and nutrient access over the full cell surface as large suspended bio-reactors provide but without the destructive action of shear forces caused by impeller or sparger agitation.

Third, tissue engineering promises unparalleled healing modalities for severe and chronic diseases. If growth and differentiation rates could be increased to reduce tissue production times, say from months to weeks, countless more lives could be saved. Thus, these synthetic substrates have been shown to be excellent for tissue engineering improving cell viability and differentiation beyond that provided by natural extra cellular materials (ECMs) extracts desirable over glass wells. Scaffolds for anchoring living cells have been studied using nano-porous anodic aluminum oxide, showing that cell spreading, morphology, and migration are modulated by filopodia recognition and conversion. These findings demonstrated that filopodia not only act as an antenna to detect microenvironments but also serve as a skeleton to guide lamellipodial extension for directing cell motions. Thus, the nano-structured films promote cell adhesion and proliferation due to accelerated lamellipodia formation and cell spreading, with recognition and conversion of filopodia into lamellipodia as a critical role in cell response to surface topography.

Despite extensive research carried out for the fabrication of nano-porous aluminum oxide materials, the synthesis of high purity nano-porous materials suitable for health and biotechnology applications remains a challenge. Nano-structured ceramic films and membranes have found uses in all of these aforementioned fields of bioscience, particularly nano-porous anodic aluminum oxide. Alumina ($Al_2O_3$) itself is intrinsically a low toxicity material. At concentrations lower than 100 µg/mL, no significant toxicity to neural stem cells is observed. Thus, aluminum oxide films have been used in human implants. However, the aforementioned traditional fabrication methods make use of chemicals that leave highly cytotoxic impurities (such as heavy metals) or environmentally harmful chemicals in intermediate and final production steps. These chemicals include one or more of the following: Chromium VI ($Cr^{+6}$), mercury (II) chloride ($Hg_2.Cl_2$), copper chloride ($CuCl_2$), bromide ($Br_2$), perchloric acid ($HClO_4$), ethylene glycol (antifreeze). Their use makes the resulting product unsuitable for health and biotechnology applications. Over time, residues from these chemicals can leach out of the finished porous film or membrane into the environment and cause harm to cell cultures and tissues, present in the production of biologics, patients, or strongly interfere with the results of drug discovery. In addition, metallic ionic species such as Chromium VI interferes with useful fluorescence bioassays employed by the healthcare industry.

Thus, there is a need in the art for an approach for manufacturing nano-structured aluminum oxide films that does not require cytotoxic chemicals.

BRIEF SUMMARY OF THE INVENTION

The present invention enables the production of high purity, biocompatible, nano-structured ceramic films and membranes by eliminating all etching steps and replacing toxic chemicals with environmentally benign alternatives. The present invention creates a safer working environment and significantly reduces costs by eliminating materials that are expensive to ship, handle and dispose. The present invention also provides a systematic set of steps for the production of high purity nano-structured aluminum oxide ceramic films with random, ordered, closed or open pores using fewer steps than traditional production methods. Overall, the present invention offers a high quality finished product suitable for health and biotechnology applications with high throughput, lower production costs, and elimination of unwanted cytotoxic impurities.

More specifically, the present invention comprises a method of manufacturing a nano-structured aluminum oxide film comprising the steps of degreasing an aluminum plate using a degreasing solution, electropolishing the aluminum plate after degreasing with an electropolishing solution that is free of perchloric acid and chromic acid, pre-anodizing the aluminum plate after electropolishing with an anodization acid solution for a first predetermined time period, anodizing the aluminum plate after electropolishing with the anodization acid solution for a second predetermined time period to form an anodized membrane on the aluminum plate, separating the anodized membrane from the aluminum plate, and cleaning the anodized membrane. The step of degreasing the aluminum plate may comprise immersing the aluminum plate in ethanol. The step of electropolishing the aluminum plate may comprise bathing the aluminum plate in a bath of phosphoric acid. The bath of phosphoric acid may comprise from about 30 percent to about 95 percent of phosphoric acid and optionally from about 5 percent to about 70 percent of polyethylene glycol. The step of bathing the aluminum plate in a bath of phosphoric acid is performed at a voltage of from about 15 to 100 volts, at a temperature from about 30° C. to about 55° C., and at a current density of from about 30 mA/cm2 to about 160 mA/cm2. The step of pre-anodizing the aluminum plate may comprise immersing the aluminum plate in an anodizing acid for between five and ten minutes. The step of anodizing the aluminum plate may comprise immersing the aluminum plate in an anodizing acid for up to twenty four hours. The step of separating the anodized membrane from the aluminum plate may comprise the step of performing soluble membrane separation. The step of performing soluble membrane separation may comprise immersing the anodized aluminum plate in sulfuric acid. The step of separating the anodized membrane from the aluminum plate may comprise the step of performing cathodic membrane delamination. The step of performing cathodic membrane delamination may comprise immersing the aluminum plate in dilute nitric acid, connecting the aluminum plate to a negative terminal of a voltage source, and applying a direct current pulse train until the anodized membrane is separable from the aluminum plate. The step of cleaning the anodized membrane may comprise submerging the anodized membrane in a phosphoric acid solution and sonicating the anodized membrane while submerged.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
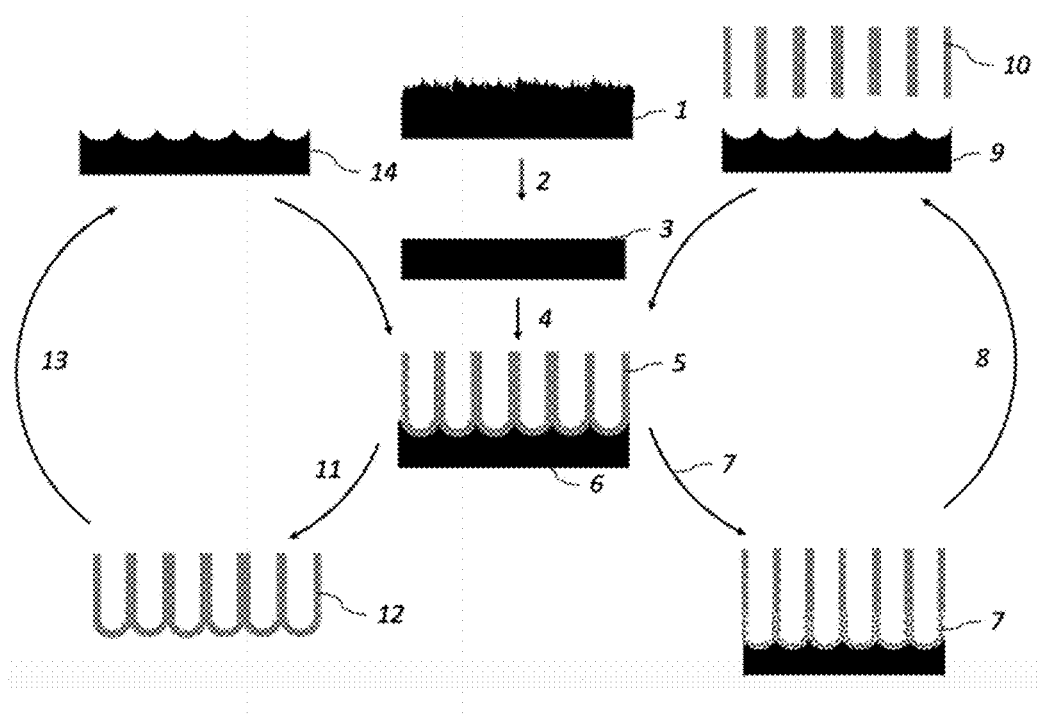
FIG. 1 is a schematic of a method of manufacturing high purity nano-structured aluminum oxide membranes using two sided aluminum plates.
Figure 2:
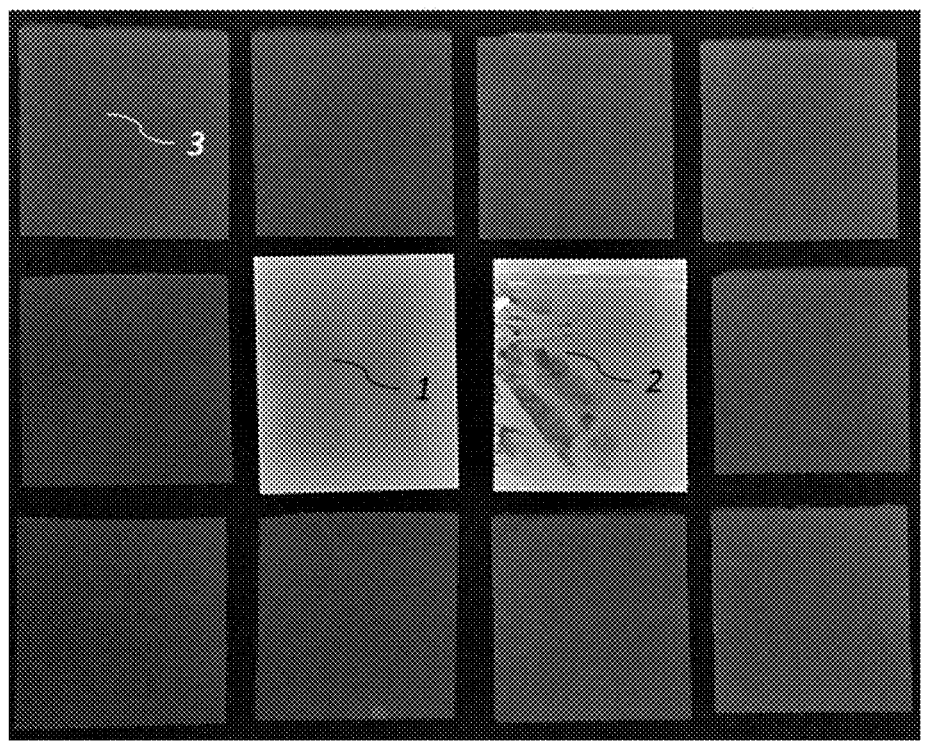
FIG. 2 is a series of images showing ten membranes obtained through cyclic anodization of an initial high purity (99.999%) aluminum plate.
Figure 3:
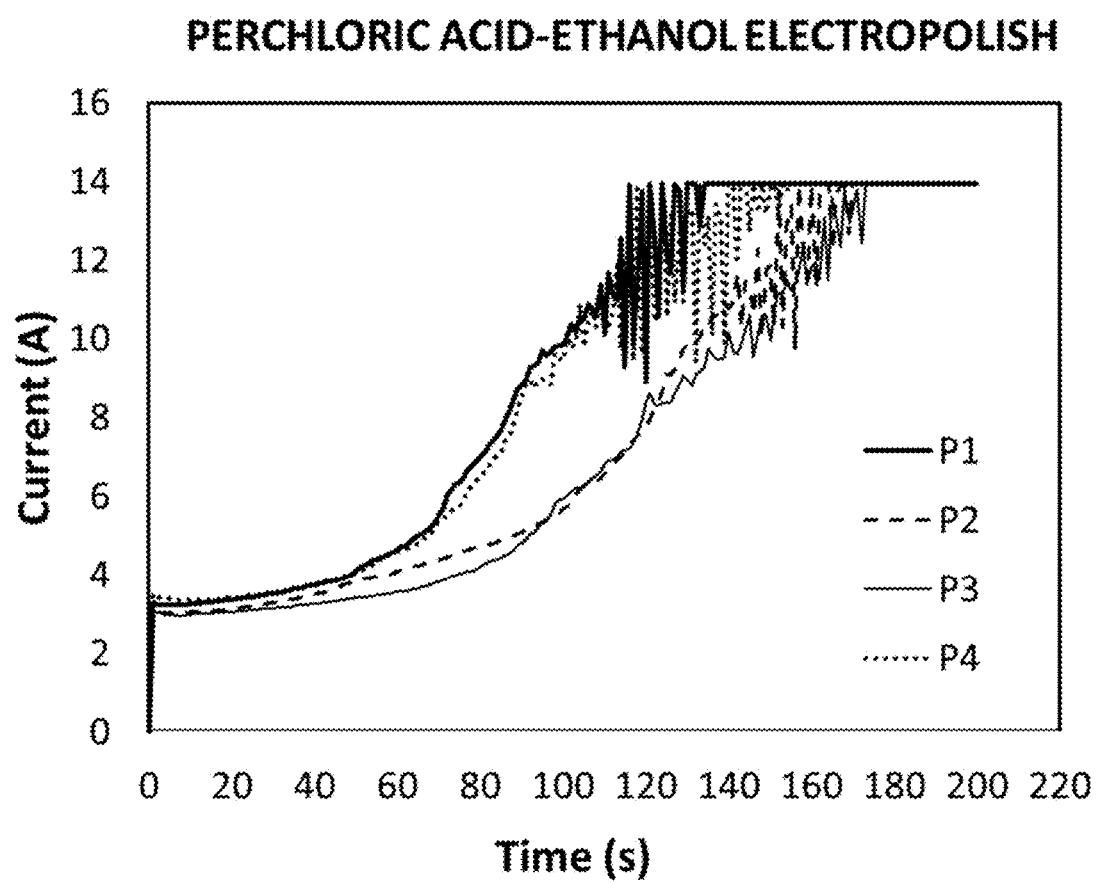
FIG. 3 is a graph of current responses to an externally constant applied voltage of 20 V for a series of four sequentially electropolished plates of dimensions 120 mm×100 mm×0.5 mm (P1-P4) in a traditional electrolyte solution (1:3 v/v solution of 72% perchloric acid in 99.7% ethanol) performed at low (0-6° C.) temperature with magnetic stirring.
Figure 4:
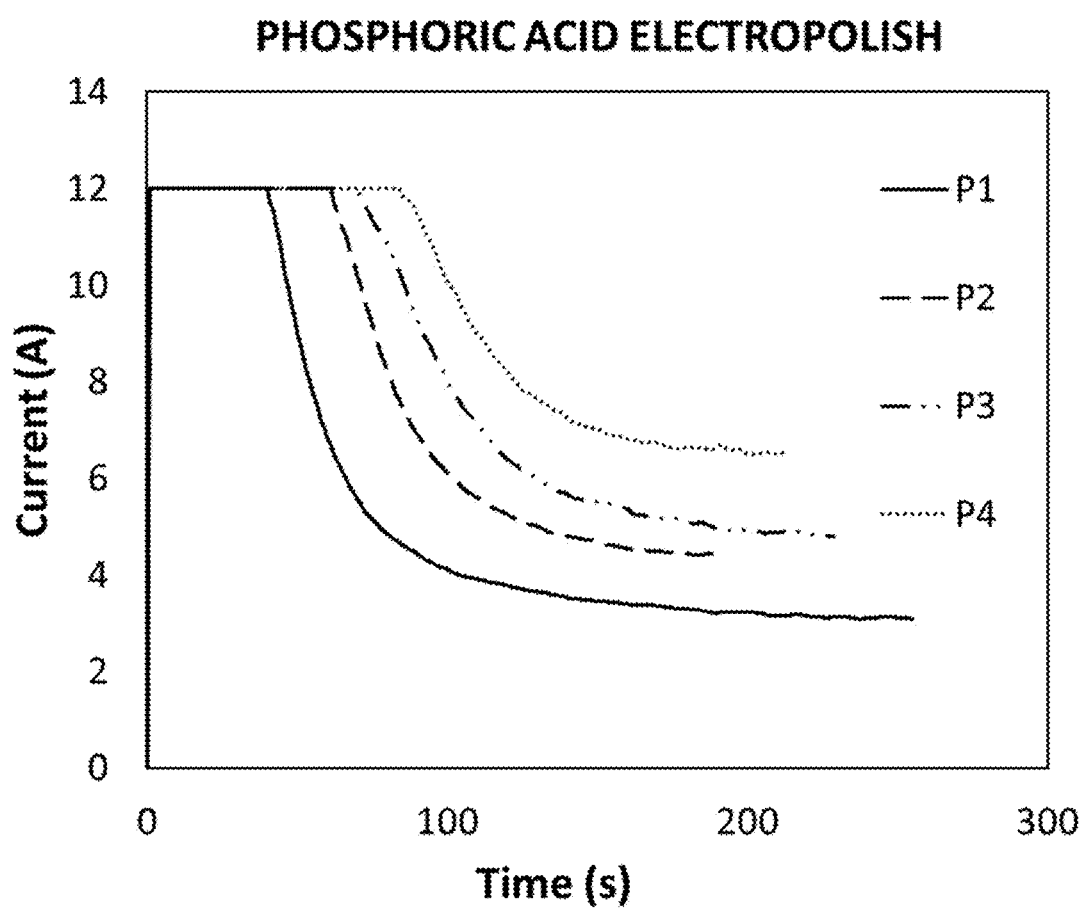
FIG. 4 is a graph of the current response for an electropolishing according to the present invention that uses only 85% technical grade phosphoric acid.

Referring to the figures, wherein like numeral refer to like parts throughout, there is seen in FIG. 1 an approach for manufacturing high purity nano-structured aluminum oxide films without the use of cytotoxic chemicals. In the present application, film is used to refer to a structure having closed pores, i.e., a pore that does not extend entirely through the film, while membrane is used to refer to a film having open pores, i.e., a pore that extends through the film. As a result, the term film encompasses the term membrane. The term cytotoxic is used in the conventional manner to refer to chemicals that are toxic to biological cells, such as chemicals that induce apoptosis, lysis, necrosis or that significantly affect cell viability and proliferation. With respect to the present application, conventional cytotoxic chemicals used in manufacturing high purity nano-structured aluminum oxide films include chemicals such as chromium and most specifically, hexavalent chromium, as well as mercury and perchlorate.

As seen in FIG. 1, an unpolished aluminum plate 1 is electropolished 2 to yield a smooth mirror-like surface 3 without the use of perchloric acid and organic solvents. The polished plate undergoes a first anodization 4 to create a disordered pore at the top (not shown) but ordered pore array at the bottom of the aluminum oxide layer 5. The metal plate contains highly ordered and periodic indentations that act as initiation sites for nanopores during second anodization and beyond 6. This and subsequent anodized layers are detached from the aluminum plate by one of two methods. In the first method, a sacrificial soluble membrane in concentrated acid is grown 7 and dissolved without the use of chrome under mild conditions 8 to yield a detached open pore membrane 10 maintaining the ordered indentations on the plate 9. The anodization process is repeated to yield other ordered membranes until the thickness of the aluminum plate is of the order of the oxide layer being produced. In the second method, cathodic delamination 11 is performed by an externally applied reverse bias voltage that separates the oxide layer from the aluminum plate to yield a closed pore film 12. The resulting plate with preserved indentations 14 can be anodized again and the process repeated enabling high throughput fabrication of close pore films.

Thus, according to the present invention, a nano-structured aluminum oxide film may thus be fabricated using solutions that are free of cytotoxins, including heavy metals such as chromium. In fact, membranes produced according to the present invention contain significantly less than one part per million of heavy metals due to the inherent impurities in the aluminum rather than as a side effect of the manufacturing process. As the present invention may be used for the production of biologics that use cells bioreactors and cell cultures (such as cell therapy and tissue engineering) to create biopharmaceuticals and healthcare products, the avoidance of cytotoxins including environmentally harmful chemicals and carcinogens as chromium VI, mercury II, and perchlorates is of paramount importance.

More specifically, the first step of the present invention comprises degreasing a high purity (>99.99%) aluminum plate using a degreasing solution such as that set forth in Table 1 below:

TABLE 1

| Degreasing solutions | Concentration | Conditions | Temperature |
|---|---|---|---|
| Ethanol | 95% v/v | immersion 5-15 m | RT |
| Iso-Propanol | 99% v/v | immersion 5-15 m | RT |
| Di-ionized water | 1-2% sodium dodecyl sulfate (SDS) | 40 Khz Ultrasonic Cleaning 5-15 m | RT |

Degreasing is a general term used to clean the surface of the aluminum plate prior to electropolishing, although grease is not the only contaminant present. Often, high quality aluminum plates are shipped for scratch protection with a thin plastic layer of protective vinyl film which can be removed by hand. Residual plastic, grease, organic matter or adhesives are to be removed prior to electropolishing. Ethanol immersion for 15 min is followed by ultrasonic cleaning in deionized water with 1-2% sodium dodecyl sulfate (SDS) detergent for 5-15 minutes. Ultra-pure water rinsing for 3 min or until water beading ceases completes the degreasing process. Plates should be thoroughly dried with clean compressed air to avoid introducing 'free' water into the electropolishing solution, which has detrimental effects.

The next step comprises electro-polishing the plate in an electropolishing solution such as that set forth in Table 2 below:

TABLE 2

| Electropolishing solution | Concentration | Conditions | Temperature |
|---|---|---|---|
| Phosphoric Acid | 85% w/w | Magnetic Stirring | RT |

Stretching of aluminum metal in drawing, stamping, and similar operations during fabrication lead to surface markings that are microns deep, which is too large to create a good nano-structured membrane. Electropolishing can mitigate these defects, leaving a smooth, mirror like surface (sub-micron defects at most in the best of cases). Unlike conventional approaches that use perchloric acid that creates environmental and performance issues, the present invention employs a phosphoric acid bath that preferably contains from about 30 percent to about 95 percent phosphoric acid and from about 5 percent to about 70 percent of polyethylene glycol. A minor amount, generally from about 0.05 to about two percent, of a wetting agent may be added to the bath if desired. The bath may be operated at voltages ranging from about 15 to 100 volts, 65° C. to about 95° C. at a current density of from about 30 mA/cm$^2$ to about 160 mA/cm$^2$. The bath forms a foamy film over the part being electroplated which leads to some "frosting."

A study was undertaken to find milder conditions and electropolish cell constructions to mitigate bubble generation at or near the anode using only concentrated 85% phosphoric acid. High purity (99.999%) 100 mm×120 mm aluminum plates were utilized for all experimental work described herein. A glass block beaker was filled with 1800 ml of technical grade, 85% Phosphoric acid, used as received. This was sufficient to fill the beaker up to the air interface line sufficient to submerge the plate up to the 110 mm. Two electrically joined aluminum counter-electrodes, identical in purity and size as the working plate, are used to enable simultaneous and symmetric electropolishing of both sides instead of platinum electrodes. The counter-electrodes maintained their conductivity and did not contribute any contaminants to the electropolishing solution over multiple (>20) uses. The counter-plates were placed parallel to one another and separated by 6 cm inside the block beaker. This distance is sufficient to avoid gas bubbles generated at the counter electrode from reaching the working electrode during electropolishing. The high viscosity of technical grade phosphoric acid is sufficient to prevent the bubbles to travel large horizontal distances before surfacing. Thus, there is no need to use special separators or oscillating stirring plates to protect the working electrode as in previous inventions. No gas evolution is observed at the working electrode. The working plate is in the mid-line between them and the electropolished cell operated and allowed to drift at room temperature.

Electropolishing is conducted with a DC power source, connected with single strand copper wire (14 gauge) with alligator clips to the electrodes. The cell is magnetically stirred. The following standard operating procedure was settled on after various tests. Set voltage is 30 V with a limiting current of 60 mA/cm$^2$. Optimal initial temperature is 30° C. and is allowed to drift to approximately 35° C. after the first electropolished plate. Up to 5 plates can be sequentially electropolished with good results. A final temperature of 50° C. is reached in the solution. Higher temperatures have a detrimental effect on the quality of the electropolishing. The same solution, after cooling, can be utilized without noticeable effects for more than 20 times. No pitting or frosting is present in the electropolished plates.

Figure 5:
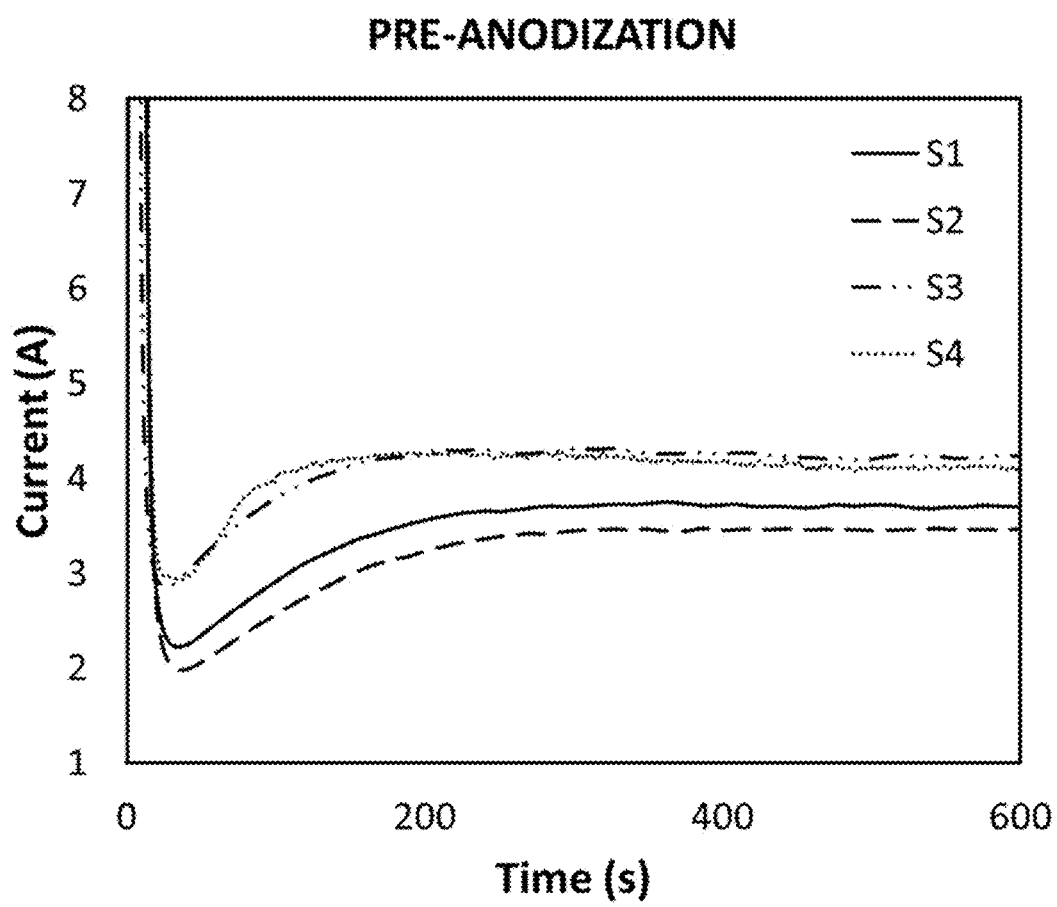
FIG. 5 is a graph of the current response for pre-anodization performed simultaneously on six plates each with effective anodization area of 110 mm×100 mm×0.5 mm.
Figure 6:
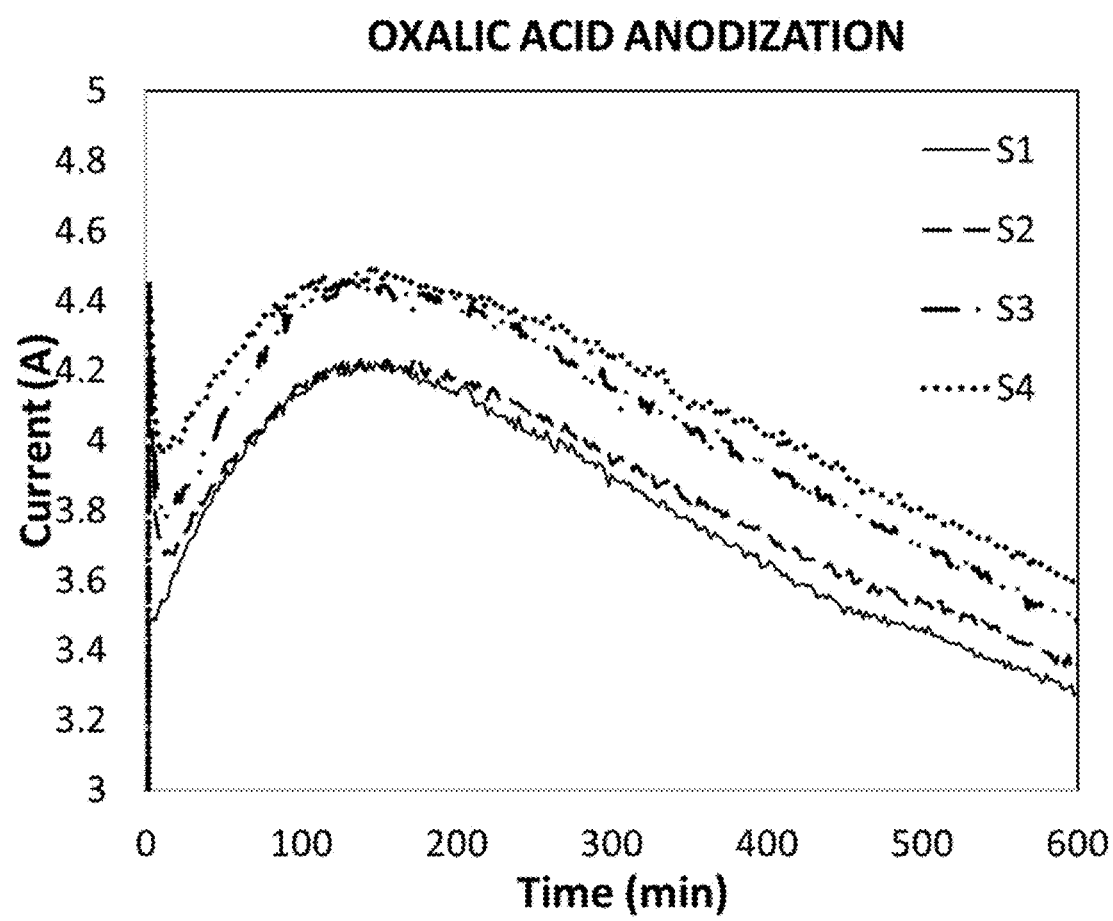
FIG. 6 is a graph of the current response for a 10-hour anodization for four separate series of six plates each, with the effective anodization area of 100 mm×100×0.5 mm.
Figure 7:
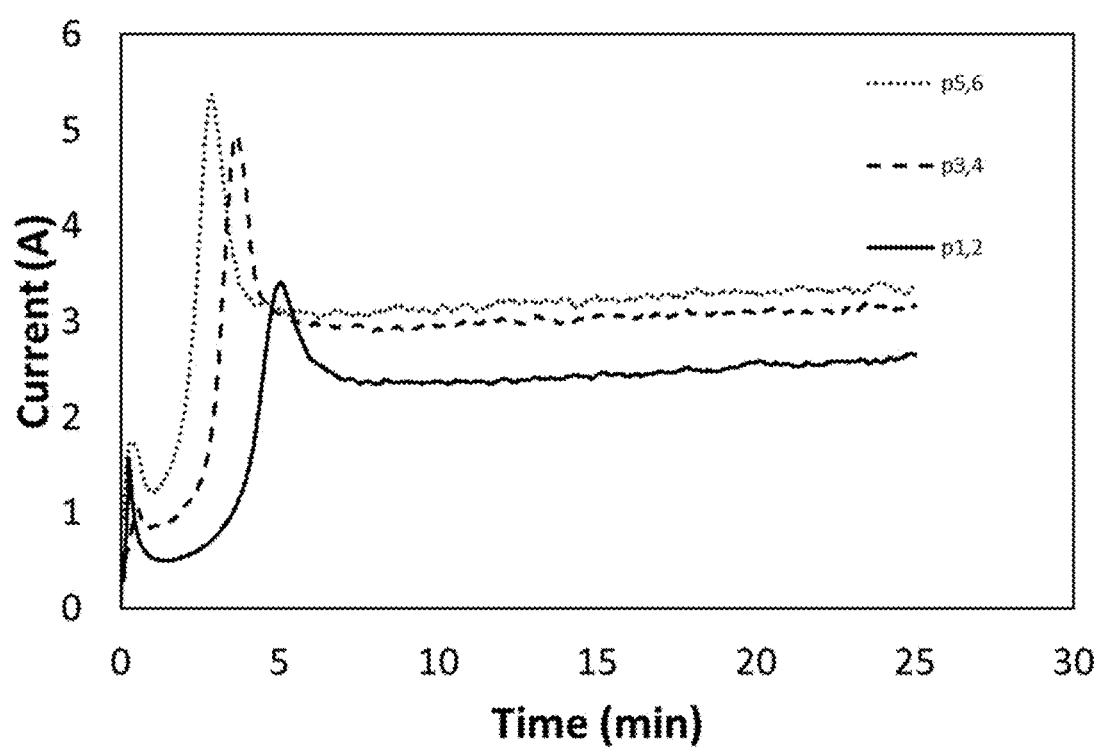
FIG. 7 is a graph of the current response for anodization in a highly concentrated diprotic acid, such as sulfuric acid, at 40 V for a period of 20 to 25 minutes that demonstrates that the anodization is sufficient to form a soluble membrane that can be dissolved simultaneously with the barrier oxide layer to generate open pore film.
Figure 8:
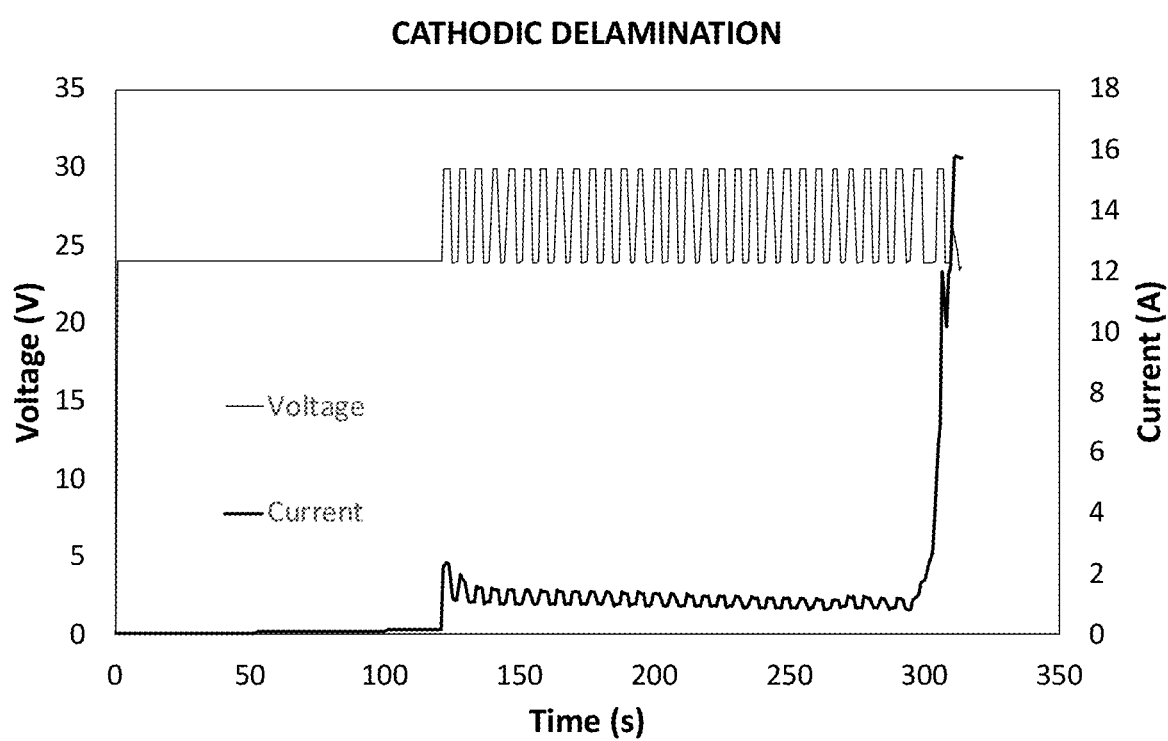
FIG. 8 is a graph of the current response for cathodic delamination in weak acidic electrolyte at room temperature that establishes the method to create closed pore films.

The quality of the electropolished surface is measured using a Snellen visual acuity chart which contains 11 lines of text with decreasing font size. A Snellen chart similar in size to the plate is reversed printed and placed at 45 degrees with respect to the polished surface. The last readable line number gives the quality of the mirror like surface obtained during electropolishing. Values >10 are typically obtained. No pitting or frosting is observed. There is no need to add silicone grease or floating oil to avoid heavy oxidation as the plate's air/solution interface appears undamaged by the process. FIG. 5 shows current vs time response of a series of up to four plates sequentially polished. Note the slight increase in the final electropolished current from plate to plate. The current is allowed to drop while the voltage is maintained. Electropolished times vary between 2 to 5 minutes.

After electropolishing, the plate is then pre-anodized in an anodization solution such as that set forth in Table 3 for a first predetermined time period.

TABLE 3

| Anodization Acid | Molecular Formula | Concentration (M) | Pore Size Range (nm) |
|---|---|---|---|
| Acetic | CH3CO2H | 1 | — |
| Acetylenedicarboxylic | HOOC—C≡C—COOH | 0.3 | 100 |

TABLE 3-continued

| Anodization Acid | Molecular Formula | Concentration (M) | Pore Size Range (nm) |
|---|---|---|---|
| Citric | HO2CCH2(OH)(CO2H)CH2CO2H | 0.1-2 | 90-250 |
| Etidronic | O=P(O)(O)C(O)(C)P(=O)(O)O | 0.2-4.2 | 400-640 |
| Formic | HCOOH | 0.5 | 50 |
| Glycolic | CH2(OH)CO2H | 1.3 | 35 |
| Ketoglutaric | HOOC—CO—(CH2)2—COOH | 0.3 | 55-85 |
| Malic | HO2CH2CH(OH)CO2H | 0.15-0.3 | 300-800 |
| Malonic | CH2(CO2H)2 | 0.1-5 | 70-75 |
| Oxalic | C2H2O4 | 0.2-0.5 | 20-80 |
| Phosphoric | H3PO4 | 0.04-1.1 | 30-500 |
| Sulfamic | NH2SO3H | 0.1 | 40-60 |
| Sulfuric | H2SO4 | 0.18-2.5 | 12-100 |
| Tartaric | HO2CCH(OH)CH(OH)CO2H | 0.1-3 | — |
| Tartronic | HOOC—C(OH)—COOH | — | 70 |

It is common to have corrosion problems due to uneven current densities and local burning at the solution/air interface during anodization of aluminum plates. The presence of oxygen leads to irregular anodization of foils and plates at corrosion points, which may be on the order of 1 mm in size but sufficient to cause current fluctuations above 10-30 mA. Silicone based oils at the surface of the anodization bath can prevent high oxidation at the interface, depleting anodizing acid solution by replacing the solution/air interface with a silicone/air interface'. However, this leads to contamination of the solution with silicone. Pre-anodization, a very brief anodization, is used to promote the adherence of a polymer film that restricts membrane growth to only one side of the aluminum foil. Membrane growth is restricted for easier removal of the AAO from the aluminum substrate. Pre-anodization can generate a protective layer against corrosion. In the present invention a 120×100 mm plate is immersed in the anodization solution B up to 110 mm mark and anodized for 10-20 minutes. Subsequently the plate is lifted to the 10 cm mark, leaving a 10 mm anodized surface on the plate which is corrosion resistant. The additional 10 mm band is used to connect the plate to the source and to leave sufficient space for anodizing above the pre-anodization line for subsequent generation of a soluble membrane detachment line.

After electropolishing, the plate is then anodized in an anodization solution such as that in Table 3 for a second predetermined time period that is longer than the first predetermined period. Anodization is the process of converting aluminum metal, as an anode or "working electrode" in an electrochemical cell, into aluminum oxide. Inert metal (Pt) or carbon cathodes, counter-electrodes, are used to apply a specific voltage across the electrolyte. Most common electrolytes are acids which contribute hydronium ions ($H_3O+$) as the consumed electroactive acidic species that provides the main ionic current to create the oxide layer. An acidic environment is needed to keep a fluid layer available for membrane growth. About 30% of the current produces dissolved species, while 70% of the current produces solid oxide. When the external applied potential is turned off, the current ceases and the dissolved species solidify and form a barrier layer on the aluminum surface. The process closes the pores at the growing end. Under the right conditions the oxidation of the aluminum metal leads to hexagonal closed packed ordered pores. It has been suggested that as the pores crowd the surface of the metal a cell patterning arises from the electrohydrodynamic (EHD) convection process rather than the interfacial tension gradients near the anode surface (Marangoni-type instability). Typically, the first anodization layer is only ordered array of pores at the bottom of the membrane. This membrane is detached by one of the two methods outlined below. The detachment must be done in a manner that the indentations on the aluminum metal are protected so that subsequent anodizations produce ordered membranes.

After anodization, the anodized membrane is separated from the surface of the aluminum using one of the alternative approaches, i.e., soluble membrane separation or cathodic membrane delamination, as described in more detail herein.

For soluble membrane separation, if a highly concentrated diprotic acid, such as 12 M sulfuric acid, is used for anodization, sufficient conjugate base anions can be incorporated into the anodic growing film to create a sulfate rich oxide membrane that is soluble in a slightly acidic aqueous solution. Through-hole membranes can be obtained by first anodizing in a weak acid followed by a second anodization in a concentrated diprotic acid. Because the second membrane is soluble, the first membrane will be detached from the aluminum substrate if this doubly anodized membrane is immersed in an appropriate etching solution. For example, using a standard acid anodization, such as those listed Table 3, and a subsequent anodization in a strong diprotic acid, such as concentrated sulfuric acid, a through pore membrane of the first anodization acid will be obtained. This forms the basis for a Masuda sacrificial layer anodization process. Conventional approaches require chromate, which results in hexavalent chromium that is considered carcinogenic by Occupational Safety and Health Administration (OSHA) and Department of Health and Human Services (HHS) and listed as one of 10 restricted substances by the European Community (EC). The risk of developing lung, nasal, and sinus cancer increases with the amount of hexavalent chromium inhaled and the length of time the worker is exposed. According to the present invention, ordered membranes can be obtained in subsequent anodizations when dissolving the soluble membrane, over relatively short periods of time (20-40 minutes) under milder, 20-25° C., temperatures using 6% w/w phosphoric acid alone without the use of chromate. Therefore, the aluminum nano-indentations are sufficiently deep and preserved to yield an ordered membrane after second and subsequent anodizations under these conditions. Thus, the use of chromate is eliminated in all its forms by using lower temperatures and shorter dissolution times. Similarly, any remaining barrier layer on the aluminum plate can be easily removed by gently rubbing the plate after immersion in 6% Phosphoric acid under deionized water.

For cathodic membrane delamination, the membrane is detached from the aluminum plate by an externally applied reversed bias voltage without the need for generating a sacrificial soluble membrane or using etching solutions. The anodized plate is used as a cathode, thus the method is also referred as cathodic delamination. Hydrogen bubbles at the cathode build-up enough pressure between the metal and the aluminum oxide layer to cause delamination. Both aluminum and alumina are stable in nitric acid and thus it can preserve, under proper conditions, the aluminum indentations and the thickness of the anodized membranes without dissolving either one. Nitric acid serves as the source of hydronium ions for generating hydrogen bubbles at the anodized plate. The anodized plate is immersed in 0.1 M nitric acid and a reverse biased voltage of 30 V is applied for at least 90 seconds. A pop or cracking sound signals the cathodic delamination after which the current jumps to its limiting value. One disadvantage of this sudden delamination process is that it works mainly for thick (>85 microns) membranes of limited sizes (50×50 mm). Thinner or larger membranes lead to cracks or incomplete detachment. This is due to the fact that it is difficult to create a single delamination event throughout a large surface. Once part of the aluminum oxide is delaminated, the current increases significantly in the delaminated sections of the plate, while some portions of the membrane that are still attached are unable to produce enough hydrogen for detachment. Thus, in the present invention, the cathodic delamination method is further developed to optimize the size and the thickness of membrane that can be delaminated. For thin (<80 micron) oxide layers it is important to avoid excessive pressure build up which can lead to membrane cracking. Using the method described below, it is possible to delaminate films as large 100×100 mm and as thin as 50 microns.

An acceptable cathodic delamination process for a 100× 100 mm anodized plate with 50 to 100 micron oxide layers begins with the immersion of the plate in 0.2 M nitric acid at room temperature and then connecting the plate to a negative terminal. The voltage is set $V_o$ and maintained for 120 s. A DC pulse train is then applied by ramping the voltage from $V_o$ to $V_f$ in one second, maintaining the voltage at $V_f$ for one second, and then dropping the voltage to $V_o$. This process is repeated between 30 and 50 times until the current surges to a large limiting current density, i.e., 75 mA/cm$^2$ or larger. The plate is then washed in deionized water for one minute. The oxide layer may then be lifted under ultra-pure water to fully separate it from the plate. If the attempt to lift the oxide layer fails, the plate may be immersed again in 0.2 M nitric acid and the current set to half the previously reached current density (around 37.5 mA/cm$^2$) to continue to bubble hydrogen for 10 to 30 min or as long as necessary to separate the oxide layer. For films/membranes in the range of 50 to 80 microns thick, $V_o$=20 V and $V_f$=28 V. For films/membranes in the range of 80 to 100 microns thick, $V_o$=24 V and $V_f$=30 V. The oxide layer produced is closed pore. The pores can be opened by etching and pore widening in 14% phosphoric acid at room temperature for up to 10 minutes.

After membrane separation through one of the approached described above, the plate is cleaned in a cleaning solution and the produced membrane is air dried. A holder may be used to hold multiple membranes for submerging in a sonicator. The holder keeps the membranes apart to avoid mechanical damage. To clean the surface, and to slightly enlarge the pores, a 6% w/w phosphoric acid solution may be used inside a 40 Khz ultrasonic sonicator for 5-15 minutes. The membranes may then be rinsed with sufficient deionized water and allowed to dry at room temperature.

The anodizing through cleaning steps may be repeated until the plate thickness is comparable to the thickness of a detached anodized oxide layer. Depending on the thickness of the aluminum plate used, and the thickness of the produced membrane, the procedures described above can be repeated multiple times. A rule of thumb is that $$N = \frac{(T-t)}{t},$$

with N being the number of ordered membranes of thickness t that can be produced from a plate of thickness T. Typical values are T=0.5 to 2.5 mm, t=25 to 100 µm. First, anodization membranes are only ordered at the bottom, the side closer to the aluminum plate. These partially ordered first anodization membranes are still useful but may contain defects such as pore coalescing. Second and subsequent anodizations show local order, hexagonal close pack, within the aluminum grain boundaries. As the anodization number increases, it is observed that the order of the pore domain increases beyond the initial aluminum grain boundaries. Thus, a fifth anodization membrane has twice the size of ordered domains as the bottom side of the first anodization. This is shown in Table 4 below, which lists the average domain size for sequential anodization of a 0.5 mm thick 99.999% aluminum plate. Anodization times are 10-12 hours in 0.3 M Oxalic Acid at 15° C. average temperature with an average membrane thickness of 50 microns.

TABLE 4

| Anodization # | Domain Size (microns) |
|---|---|
| 1 | 0.45 |
| 2 | 0.72 |
| 3 | 0.88 |
| 4 | 0.99 |
| 5 | 1.15 |

Any liquid waste generated by the present invention can be safely disposed-off through standard acid-base neutralization using sodium hydroxide. For example, neutralization of oxalic acid, after repeated anodizations, leads to a clear solution containing sodium oxalate salt and traces of aluminum oxide. This solution can be safely disposed at neutral pH. Sodium oxalate salt can also be recovered by evaporation of the solution. Sodium oxalate is a naturally occurring product of animal metabolism which finds uses as a chelating agent.

The detachment solution can also be neutralized with sodium hydroxide. The neutralization of the detachment solution results in a precipitated white solid by-product, a salt mixture of approximate 6% hydrated aluminum dihydrogen phosphate, $Al(H_2PO_4)_3 \cdot H_2O$, sodium aluminum phosphate and sodium sulfate. The salt mixture is non-toxic and it is commonly used as a stabilizer in many processed foods. Concentrated sulfuric acid, used to create soluble membranes, is neutralized with potassium hydroxide to generate potassium sulfate $K_2SO_4$, a fertilizer.

The application of aluminum oxide closed pore films and open through pore membranes according to the present invention are particularly useful for healthcare and biotechnology applications due to the absence of cytotoxic compounds. For example, membranes according to the present invention may be used in application such as, without limitation, ultra-filtration, filter sterilization, cell culturing, tissue engineering, cell sorting, DNA/RNA isolation and sequencing, biosensing, drug discovery, and immunoisolation,

What is claimed is:

1. A method of manufacturing a nano-structured aluminum oxide film, comprising:
   degreasing an aluminum plate using a degreasing solution;
   electropolishing the aluminum plate after degreasing with an electropolishing solution that is free of cytotoxic chemicals;
   pre-anodizing the aluminum plate after electropolishing by immersing the aluminum plate in an anodization acid solution for a first predetermined time period of between five and twenty minutes to form a protective film on the aluminum plate and then lifting the aluminum plate partially out of the anodization acid solution so that a first portion of the aluminum plate having the protective film is exposed and a second portion of the aluminum plate remains immersed in the anodization acid solution;
   anodizing the second portion of the aluminum plate after pre-anodizing with the anodization acid solution for a second predetermined time period that is longer than the first predetermined time period to form an anodized membrane on the second portion of the aluminum plate;
   separating the anodized membrane from the aluminum plate without using cytotoxic chemicals so that the anodized membrane is detached from the aluminum plate and the first portion of the aluminum plate intact remains intact; and
   cleaning the anodized membrane.

2. The method of claim 1, wherein the nano-structured aluminum oxide film has less than one part per million of heavy metals.

3. The method of claim 1, wherein electropolishing the aluminum plate comprises bathing the aluminum plate in a bath of phosphoric acid that is free of perchloric acid and chromic acid.

4. The method of claim 3, wherein the bath of phosphoric acid comprises from 30 weight percent to 95 weight percent of phosphoric acid and optionally from 5 weight percent to 70 weight percent of polyethylene glycol.

5. The method of claim 3, wherein bathing the aluminum plate in a bath of phosphoric acid is performed at a voltage of from 15 to 100 volts, at a temperature from 30° C. to 50° C., and at a current density of from 30 mA/cm$^2$ to 160 mA/cm$^2$.

6. The method of claim 1, wherein anodizing the aluminum plate comprises immersing the aluminum plate in a second anodizing acid for up to twenty four hours.

7. The method of claim 1, wherein separating the anodized membrane from the aluminum plate comprises performing soluble membrane separation.

8. The method of claim 7, wherein performing soluble membrane separation comprises immersing the aluminum plate in a solution of six weight percent phosphoric acid that is free of chromic acid at room temperature until a membrane separates.

9. The method of claim 1, wherein separating the anodized membrane from the aluminum plate comprises performing cathodic membrane delamination.

10. The method of claim 9, wherein performing cathodic membrane delamination comprises immersing the aluminum plate in nitric acid, connecting the aluminum plate to a negative terminal of a voltage source, and applying a direct current pulse train until the anodized membrane is separable from the aluminum plate.

11. The method of claim 1, wherein cleaning the anodized membrane comprises submerging the anodized membrane in a phosphoric acid solution and sonicating the anodized membrane while submerged.

* * * * *